(12) United States Patent
Nakamura et al.

(10) Patent No.: US 7,739,242 B2
(45) Date of Patent: Jun. 15, 2010

(54) NAS SYSTEM AND REMOTE COPY METHOD

(75) Inventors: Sadahiro Nakamura, Yokohama (JP); Yasuo Yamasaki, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 158 days.

(21) Appl. No.: 11/384,253

(22) Filed: Mar. 21, 2006

(65) Prior Publication Data
US 2007/0168404 A1 Jul. 19, 2007

(30) Foreign Application Priority Data
Jan. 17, 2006 (JP) .............................. 2006-009202

(51) Int. Cl.
*G06F 17/30* (2006.01)
(52) U.S. Cl. ................... 707/649; 707/654; 711/161
(58) Field of Classification Search ................. None
See application file for complete search history.

(56) References Cited

U.S. PATENT DOCUMENTS

| | | | | |
|---|---|---|---|---|
| 6,446,175 | B1 * | 9/2002 | West et al. | 711/162 |
| 6,691,212 | B1 * | 2/2004 | McNeil et al. | 711/162 |
| 6,745,210 | B1 * | 6/2004 | Scanlan et al. | 707/204 |
| 6,938,134 | B2 * | 8/2005 | Madany | 711/161 |
| 7,047,380 | B2 * | 5/2006 | Tormasov et al. | 711/162 |
| 7,111,136 | B2 * | 9/2006 | Yamagami | 711/162 |
| 7,127,578 | B2 * | 10/2006 | Nagata | 711/162 |
| 7,194,487 | B1 * | 3/2007 | Kekre et al. | 707/201 |
| 7,197,665 | B2 * | 3/2007 | Goldstein et al. | 714/20 |
| 7,225,204 | B2 * | 5/2007 | Manley et al. | 707/200 |
| 7,293,050 | B2 * | 11/2007 | Arakawa et al. | 707/204 |
| 7,296,125 | B2 * | 11/2007 | Ohran | 711/162 |
| 7,437,389 | B2 * | 10/2008 | Iwamura et al. | 707/204 |
| 2003/0182313 | A1 * | 9/2003 | Federwisch et al. | 707/200 |
| 2004/0034752 | A1 * | 2/2004 | Ohran | 711/161 |
| 2004/0181642 | A1 * | 9/2004 | Watanabe et al. | 711/162 |
| 2004/0186900 | A1 | 9/2004 | Nakano et al. | |
| 2004/0267836 | A1 * | 12/2004 | Armangau et al. | 707/203 |
| 2005/0027748 | A1 * | 2/2005 | Kisley | 707/200 |
| 2005/0193026 | A1 * | 9/2005 | Prahlad et al. | 707/200 |
| 2006/0080362 | A1 * | 4/2006 | Wagner et al. | 707/200 |
| 2006/0271604 | A1 * | 11/2006 | Shoens | 707/201 |

FOREIGN PATENT DOCUMENTS

JP 2004-342050 12/2004

* cited by examiner

*Primary Examiner*—Tim T. Vo
*Assistant Examiner*—Michelle Owyang
(74) *Attorney, Agent, or Firm*—Antonelli, Terry, Stout & Kraus, LLP.

(57) ABSTRACT

The present invention remote copies difference data for snapshots in an appropriate manner. A NAS system having one or more file systems for storing data, a snapshot producing section for producing snapshots for the file systems based on a pre-scheduled snapshot acquisition time, a remote copy section for remote copying difference data for the snapshots based on pre-scheduled remote copy start times, and a scheduling section for re-scheduling the time of one or more of an Nth snapshot acquisition time, an Nth remote copy start time, and an (N+1)th remote copy start time, in such a manner that remote copying starting at the Nth remote copy start time finishes by the (N+1)th remote copy start time.

12 Claims, 23 Drawing Sheets

FIG.9

NETWORK GROUP MANAGEMENT TABLE 500

| # | TABLE ELEMENT | NUMBER OF ELEMENTS | OUTLINE |
|---|---|---|---|
| 1 | NETWORK DEVICE | 1 | NAMES OF NETWORK DEVICES UTILIZED BY REGISTERED PAIRS |
| 2 | PAIR NUMBER | 1 | REGISTERED NUMBER OF PAIRS |
| 3 | COMMUNICATION BAND | 1 | BAND UPPER LIMIT DURING SETTING |
| 4 | PAIR INFORMATION | RECORDED NUMBER OF PAIRS | NUMBER OF PAIRS TARGETTED FOR CARRYING OUT PRIORITY CONTROL |

FIG.10

PAIR INFORMATION TABLE 600

| # | TABLE ELEMENT | ELEMENT NUMBER | OUTLINE |
|---|---|---|---|
| 1 | PAIR NAME | 1 | NUMBER OF PAIRS TARGETTED FOR CARRYING OUT PRIORITY CONTROL |
| 2 | REMOTE COPY START TIME | 1 | TIME OF STARTING REMOTE COPY |
| 3 | START TIME OF NEXT REMOTE COPY | 1 | TIME OF STARTING REMOTE COPY FOR THE NEXT TIME |
| 4 | NEXT SNAPSHOT ACQUISITION TIME | 1 | TIME OF PRODUCING SNAPSHOT FOR THE NEXT TIME |
| 5 | PRIORITY | 1 | ORDER OF PRIORITY WHILE DETERMINING SUSPENSION OF REMOTE COPYING OF PAIRS |
| 6 | DIFFERENCE SNAPSHOT SIZE | 1 | TOTAL SIZE OF DATA TRANSFERRED |
| 7 | REMOTE COPY STATE | 1 | STATE OF ONE OF "STANDBY" OR "IN OPERATION" |

FIG.12

NETWORK GROUP MANAGEMENT TABLE    500

| # | TABLE ELEMENT NAME | | |
|---|---|---|---|
| 1 | NETWORK DEVICE NAME | eth1 | eth2 |
| 2 | PAIR NUMBER | 2 | 1 |
| 3 | COMMUNICATION BAND | 10MB/sec | 100MB/sec |
| 4 | PAIR INFORMATION | SnapA,SnapB | SnapC |

FIG.13

PAIR INFORMATION TABLE    600

| # | TABLE ELEMENT NAME | A | B | C |
|---|---|---|---|---|
| 1 | PAIR NAME | SnapA | SnapB | SnapC |
| 2 | REMOTE COPY START TIME | | | |
| 3 | NEXT REMOTE COPY START TIME | 2:00 | 2:00 | 4:00 |
| 4 | NEXT SNAPSHOT ACQUISITION TIME | 2:00 | 2:00 | 4:00 |
| 5 | PRIORITY | 1 | 2 | 1 |
| 6 | SIZE | | | |
| 7 | REMOTE COPY STATE | STANDBY | STANDBY | STANDBY |

FIG.15

NETWORK GROUP MANAGEMENT TABLE 500

| # | TABLE ELEMENT NAME | 値 |
|---|---|---|
| 1 | NETWORK DEVICE NAME | eth1 |
| 2 | PAIR NUMBER | 3 |
| 3 | COMMUNICATION BAND | 10MB/sec |
| 4 | PAIR INFORMATION | SnapA,SnapB,SnapD |

FIG.16

PAIR INFORMATION TABLE 600

| # | TABLE ELEMENT NAME | A | B | D |
|---|---|---|---|---|
| 1 | PAIR NAME | SnapA | SnapB | SnapD |
| 2 | REMOTE COPY START TIME | | | |
| 3 | NEXT REMOTE COPY START TIME | 2:00 | 2:00 | 2:00 |
| 4 | NEXT SNAPSHOT ACQUISITION TIME | 2:00 | 2:00 | 2:00 |
| 5 | PRIORITY | 1 | 3 | 2 |
| 6 | SIZE | | | |
| 7 | REMOTE COPY STATE | STANDBY | STANDBY | STANDBY |

FIG.18

NETWORK GROUP MANAGEMENT TABLE 500

| # | TABLE ELEMENT NAME | 値 |
|---|---|---|
| 1 | NETWORK DEVICE NAME | eth1 |
| 2 | PAIR NUMBER | 3 |
| 3 | COMMUNICATION BAND | 10MB/sec |
| 4 | PAIR INFORMATION | SnapA,SnapB,SnapD |

FIG.19

PAIR INFORMATION TABLE 600

| # | TABLE ELEMENT NAME | A | B | D |
|---|---|---|---|---|
| 1 | PAIR NAME | SnapA | SnapB | SnapD |
| 2 | REMOTE COPY START TIME | — | 2:00 | 2:00 |
| 3 | NEXT REMOTE COPY START TIME | 2:50 | 2:50 | 2:50 |
| 4 | NEXT SNAPSHOT ACQUISITION TIME | 2:50 | 2:50 | 2:50 |
| 5 | PRIORITY | 1 | 3 | 2 |
| 6 | SIZE | 30000 | 20000 | 10000 |
| 7 | REMOTE COPY STATE | IN OPERATION | IN OPERATION | IN OPERATION |

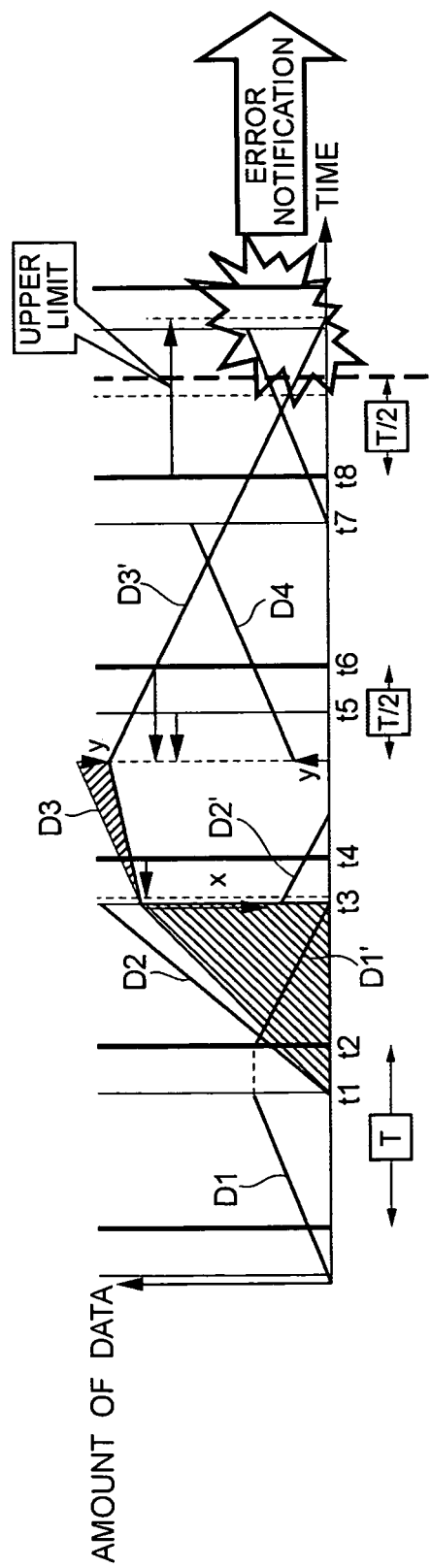

NAS SYSTEM AND REMOTE COPY METHOD

CROSS-REFERENCES TO RELATED APPLICATIONS

This application relates to and claims priority from Japanese Patent Application No. 2006-9202, filed on Jan. 17, 2006, the entire disclosure of which is incorporated herein by reference

BACKGROUND OF THE INVENTION

The present invention relates to a NAS system equipped with a snapshot function, and a difference snapshot remote copy method.

In the related art, one function of a NAS (Network Attached Storage) system is a so-called "snapshot" function of logically holding a data image for a primary volume (a logical volume for storing user data) at a point in time when a snapshot generation instruction is received. A snapshot function is utilized when data of a primary volume is erased due to human error or when it is wished to restore a data image for a primary volume at a desired point in time, etc.

A difference snapshot is disclosed in Japanese Patent Laid-open Publication No. 2004-342050 (US Unexamined Patent Publication 2004/0186900). According to a difference snapshot, a data image for a primary volume at a certain point in time in the past is logically restored using information indicating updated data of the primary volume for after the point in time the snapshot generation instruction is provided and the update position of this data. A difference snapshot therefore has the advantage that it is possible to maintain a data image for a primary volume at the point in time designated for snapshot generation using a lower storage capacity compared with the case where a data image for an entire primary volume is stored as is.

However, it is not possible to restore a data image for a primary volume by utilizing a snapshot when there is damage to a storage system equipped with a snapshot function. A remote copy system taking this situation into consideration where difference data for a snapshot acquired by a first NAS system arranged at a primary site is remote copied to a second NAS system installed at a secondary site and a snapshot is also maintained at the second NAS system so that when a fault occurs at the first NAS system, a data image for the first NAS system is restored using a snapshot of the second NAS system is also well-known.

In the remote copy system, the first NAS system acquires a snapshot based on a time preset by the user, and difference data for this snapshot is remote copied to the second NAS system. A plurality of file systems are installed at the first and second NAS systems. Difference data for snapshots for the plurality of file systems installed on the first NAS system is respectively remote copied to the respective plurality of files systems installed on the second NAS system. The file system for the remote copy source and the file system for the remote copy destination correlate, with the relationship between the two being referred to as a "pair".

SUMMARY OF THE INVENTION

However, the data size of the difference data of the snapshot depends on the amount of data updated at the primary volume of the first NAS system due to requests from the host system between the acquisition of a snapshot at a certain point in time until the acquisition of a snapshot at the next point in time. In other words, difference data for a snapshot is variable data of a data size that fluctuates dynamically. If the data size of the difference data for a snapshot increases, the time required for remote copying increases. Design of a system for remote copying difference data for a snapshot having the property of variable data in an appropriate manner is not straightforward. For example, with the case where difference data for snapshots for a plurality of pairs is remote copied at the same time, it is necessary for remote copying for all of the pairs to finish normally at least by the time the next remote copy starts. When difference data for a snapshot is more than expected for one of the pairs, this not only influences the time necessary to remote copy difference data for the snapshot for this pair, but also influences remote copying of difference data for snapshots of other pairs. In the worst case, it may not be possible to finish remote copying of difference data for a snapshot for a certain pair before the time of starting the next remote copy.

In order to resolve the aforementioned problem, it is the object of the present invention to remote copy snapshot difference data in an appropriate manner.

In order to achieve the aforementioned object, a NAS system of the present invention is comprised of one or more file systems for storing data, a snapshot producing section for producing snapshots for the file systems based on a pre-scheduled snapshot acquisition time, a remote copy section for remote copying difference data for the snapshots based on pre-scheduled remote copy start times, and a scheduling section for re-scheduling the time of one or more of an Nth snapshot acquisition time, an Nth remote copy start time, and an (N+1)th remote copy start time, in such a manner that remote copying starting at the Nth remote copy start time finishes by the (N+1)th remote copy start time.

According to the present invention, it is possible to remote copy difference data for snapshots in an appropriate manner.

BRIEF DESCRIPTION OF THE DRAWINGS

FIG. 9 is a view illustrating a network management table.

FIG. 10 is a view illustrating a pair information table.

FIG. 10 is a view illustrating a pair information table.

FIG. 12 is a further view illustrating a network management table.

FIG. 13 is another view illustrating a pair information table.

FIG. 15 is a view illustrating a network management table.

FIG. 16 is a further view illustrating a pair information table.

FIG. 18 is a view illustrating a network management table.

FIG. 19 is another view illustrating a pair information table.

FIG. 30 is a yet further graph showing change in the amount of difference data for a snapshot.

DESCRIPTION OF THE PREFERRED EMBODIMENT

The following is a description with reference to the drawings of an embodiment of the present invention.

Figure 1:
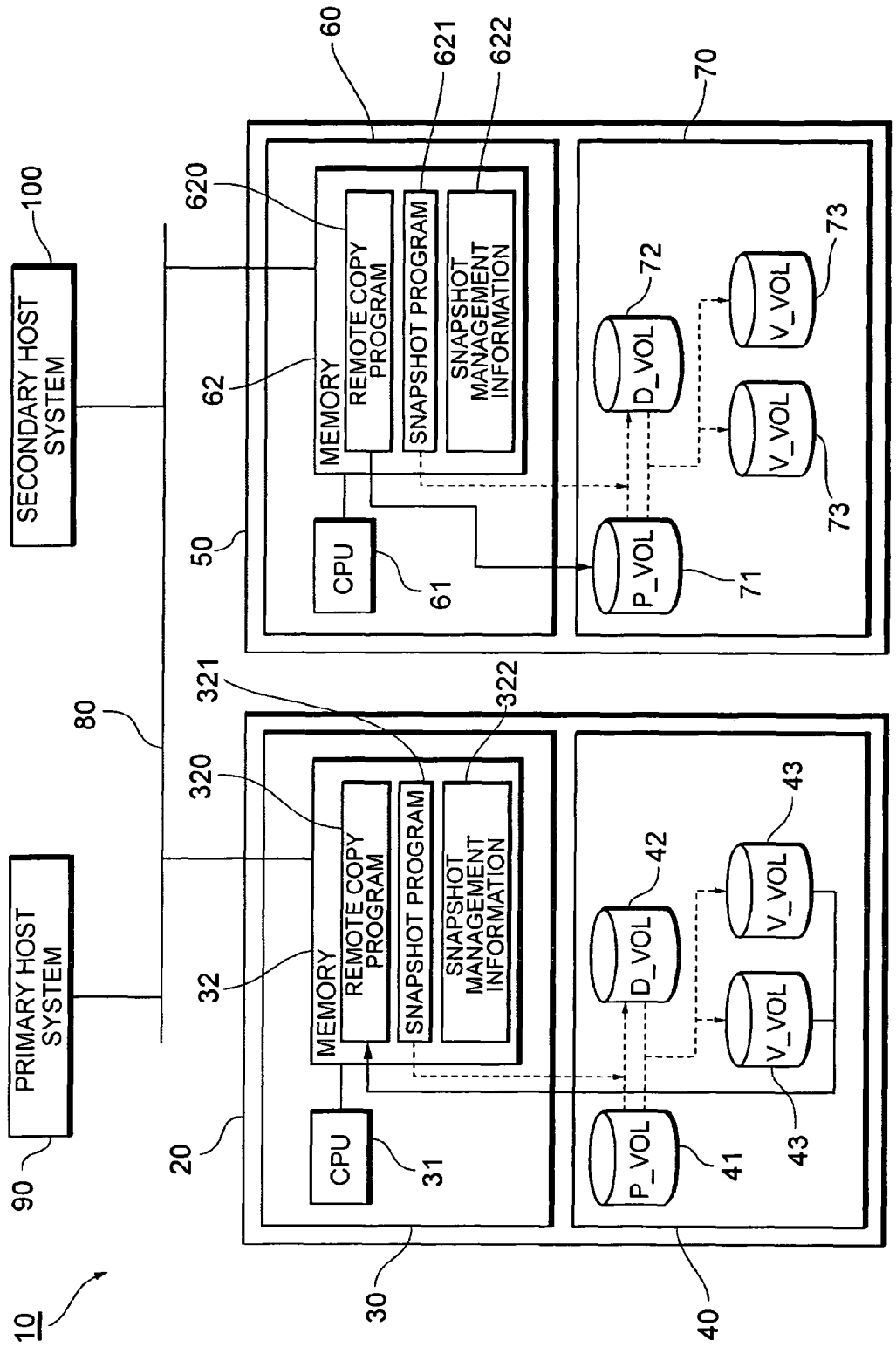
FIG. 1 is a system configuration view of a storage system of an embodiment.

In FIG. 1, a storage system 10 of this embodiment is comprised of a NAS system 20 installed at a primary site, and a NAS system 50 installed at a secondary site. The NAS system 20 and the NAS system 50 are connected via a network 80. The network 80 is a data communication network such as a LAN (Local Area Network) or WAN (Wide Area Network).

A primary host system 90 as an operation system accesses data on the NAS system 20. If a fault then occurs at either of the primary host system 90 or the NAS system 20, the NAS system 50 restores a past data image for the file system managed by the NAS system 20 using a snapshot. A secondary host system 100 then accesses the data on the NAS system 50 and takes over the tasks of the primary host system 90.

The NAS system 20 is equipped with a NAS server 30 and a storage control device 40. The NAS server 30 is comprised of a CPU 31 and memory 32. When a file access request instructing a file name is received from the primary host system 90, the CPU 31 generates an I/O request taking blocks constituted by data management units occurring at the storage control device 40 as units and outputs this I/O request to the storage control device 40.

A remote copy program 320, snapshot program 321, and snapshot management information 322 are stored in the memory 32.

The remote copy program 320 has a function for transmitting difference data for a snapshot to the NAS system 50 by remote copying.

The snapshot program 321 has a function for producing snapshots of the primary volume 41. The snapshot program 321 produces a snapshot of the primary volume 41 at a certain point in time in the past by managing information relating to the location of updates to data on the primary volume 41. For example, when data on the primary volume 41 is updated, the snapshot program 321 writes the new data to the primary volume 41 after the data prior to updating (old data) is saved to a difference volume 42. Management information relating to the position of updated data and the destination of saved data prior to updating etc. is managed using the snapshot management information 322. As a result, it is possible to manage a snapshot occurring at a certain point in time in the past across a plurality of generations.

Storage control device 40 is comprised of a primary volume 41, difference volume 42, and a plurality of virtual volumes 43. The primary volume 41 is a logical volume for storing user data. The difference volume 42 is a logical volume for saving the data for before updating of the primary volume 41. Each of the plurality of virtual volumes 43 logically saves a snapshot of the primary volume 41 occurring at a certain point in time in the past.

The NAS system 50 is equipped with a NAS server 60 and a storage control device 70. The NAS server 60 is comprised of a CPU 61 and memory 62. When a file access request instructing a file name is received from the secondary host system 100, the CPU 61 generates an I/O request taking blocks constituted by data management units occurring at the storage control device 70 as units and outputs this I/O request to the storage control device 70.

A remote copy program 620, snapshot program 621, and snapshot management information 622 are stored in the memory 62.

The remote copy program 620 has a function for receiving difference data for a snapshot from the NAS system 20 by remote copying.

The snapshot program 621 has a function for producing snapshots of the primary volume 71. The snapshot program 621 produces a snapshot of the primary volume 71 at a certain point in time in the past by managing information relating to the location of updates to data on the primary volume 71. For example, when data on the primary volume 71 is updated, the snapshot program 621 writes the new data to the primary volume 71 after the data prior to updating (old data) is saved to a difference volume 72. Management information relating to the position of updated data and the destination of saved data prior to updating etc. is managed using the snapshot management information 622. As a result, it is possible to manage a snapshot occurring at a certain point in time in the past across a plurality of generations.

Storage control device 70 is comprised of a primary volume 71, difference volume 72, and a plurality of virtual volumes 73. The primary volume 71 is a logical volume for storing user data. The difference volume 72 is a logical volume for saving the data for before updating of the primary volume 71. Each of the plurality of virtual volumes 73 logically saves a snapshot of the primary volume 71 occurring at a certain point in time in the past.

In the following description, a configuration is assumed where the NAS system 20 and the NAS system 50 respectively have a plurality of file systems and a plurality of pairs are formed across both parties. However, it is by no means essential that a plurality of file systems are present at the NAS system 20 and the NAS system 50 and a configuration where only a single pair exists between both parties is also possible.

Next, a description is given while referring to FIG. 2 to FIG. 5 of a remote copying scheduling method of this embodiment. In these drawings, time t0 is start time of the (N−1)th remote copy, time t1 is the end time of the (N−1)th remote copy, time t2 is the acquisition time for the nth snapshot, time t3 is the start time of the nth remote copy, time t4 is the acquisition time of the (N+1)th snapshot, and time t5 is the start time for the (N+1)th remote copy.

Figure 2:
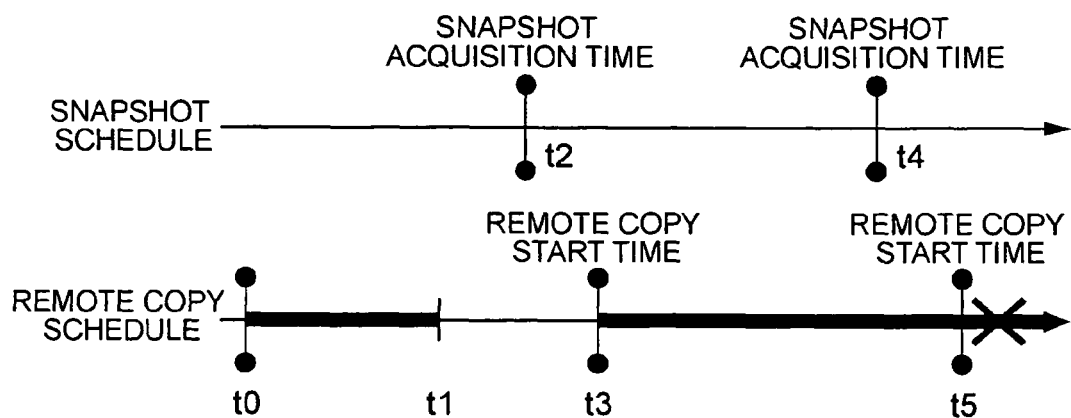
FIG. 2 is a view illustrating re-scheduling of a snapshot acquisition time or remote copy start time.

As shown in FIG. 2, at the NAS system 20, at time t1, when remote copying for the (N−1)th time finishes for all of the pairs, the total amount of data transferred in the Nth remote copy for all of the pairs is estimated based on the total amount of data transferred in the (N−1)th remote copy for all of the pairs, and the remote copy time is estimated based on the estimated total amount of data. In the event that the results of this estimate are that this is in time for the start time t5 of the (N+1)th remote copy even is the Nth remote copy is subjected to parallel processing for all of the pairs, remote copying is executed for all pairs as is. At this time, in addition to calculating the amount of data at the time of compressing the data to be transferred, it is preferable to check whether or not remote copy will be completed for all of the pairs by the start time t5 of the (N+1)th remote copy even if the Nth remote copy is carried out using parallel processing. In the event that it is estimated for the Nth remote copy that remote copying of any of the pairs will not finish by the start time t5 of the (N+1)th remote copy, as shown in FIG. 3 to FIG. 5, the remote copy start times t3 and t5 or the snapshot acquisition times t2 and t4 are re-scheduled.

Re-scheduling of the remote copy start times t3 and t5 and the snapshot acquisition times t2 and t4 is taken to be carried out by the point in time of time t1 where the (N−1)th remote copy is complete.

Figure 3:
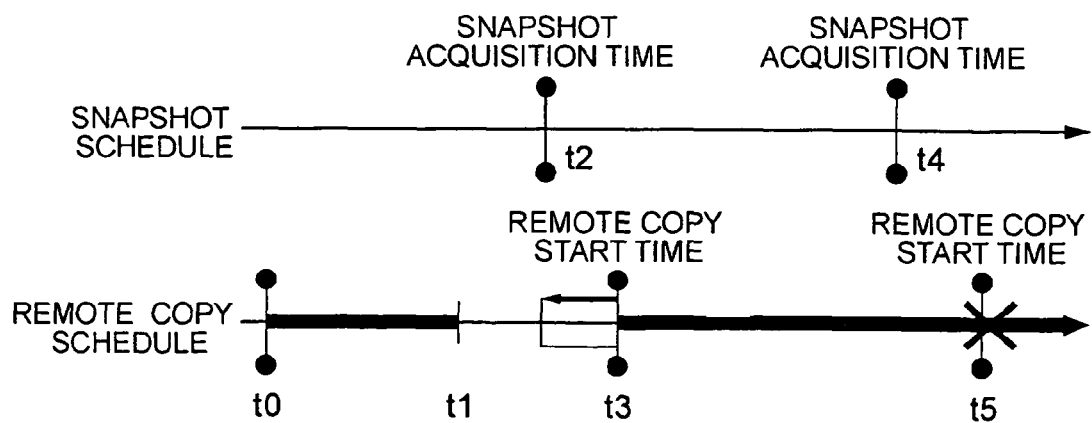
FIG. 3 is a further view illustrating re-scheduling of a snapshot acquisition time or remote copy start time.

In the event that it is estimated for the Nth remote copying that remote copying for one of the pairs will not finish before the start time t5 for the (N+1)th remote copy, as shown in FIG. 3, first, the NAS system 20 checks whether or not this will be in time for the start time t5 for the (N+1)th remote copying even if parallel processing is carried out for the Nth remote copying for all of the pairs by moving forward (making sooner) the start time t3 of the Nth remote copying up to the acquisition time t2 of the Nth snapshot.

Figure 4:
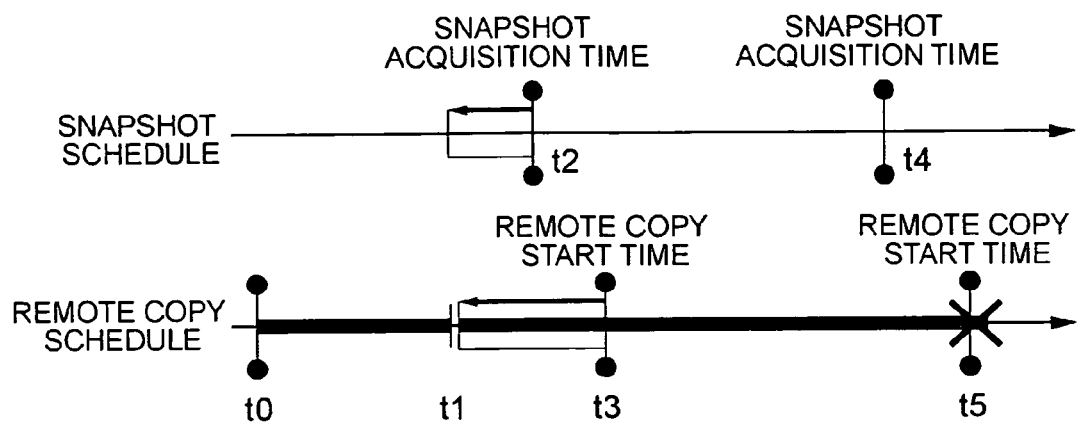
FIG. 4 is another view illustrating re-scheduling of a snapshot acquisition time or remote copy start time.
Figure 5:
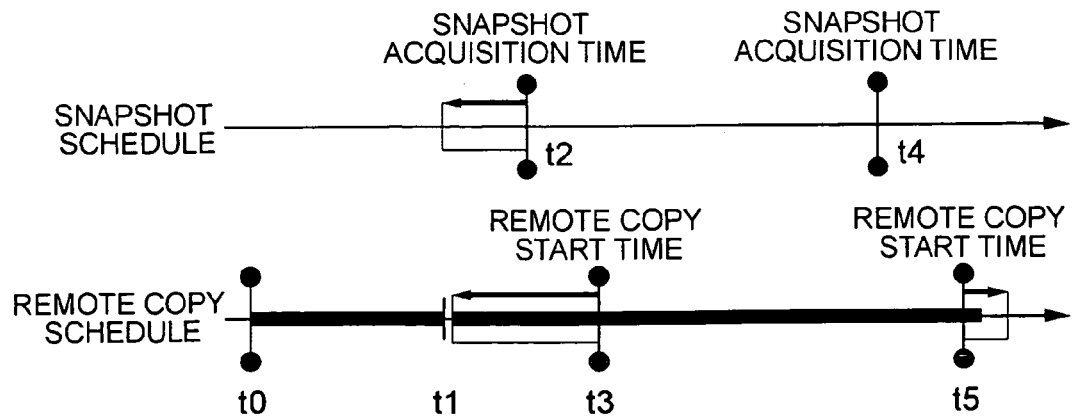
FIG. 5 is a still further view illustrating re-scheduling of a snapshot acquisition time or remote copy start time.

In the event that it is estimated that remote copying of one of the pairs for the Nth remote copy will not finish before the start time t5 of the (N+1)th remote copy even when the start time t3 of the Nth remote copying is brought forward as far as possible, as shown in FIG. 4, it is checked whether or not the Nth remote copying for all of the pairs will be finished before the start time t5 for the (N+1)th remote copying even if the Nth remote copying for all of the pairs is subjected to parallel processing, by bringing the acquisition time t2 for the Nth snapshot forward as far as possible to the end time t1 of the (N−1)th remote copy.

In the event that it is estimated for the Nth remote copying that remote copying of one of the pairs will not be completed before the start time t5 of the (N+1)th remote copying even if the acquisition time t2 for the Nth snapshot is moved forward as far as possible to the end time t1 of the (N−1)th remote copying, as shown in FIG. 5, it is checked whether or not the Nth remote copying for all of the pairs will finish before the start time t5 of the (N+1)th remote copying in the case of parallel processing, by putting back (delaying) the start time t5 of the (N+1)th remote copying.

The NAS server 20 then reschedules the remote copy start times t3 and t5 and the snapshot acquisition times t2 and t4 based on predetermined priorities and is then able to complete remote copying for all of the pairs without any shortfalls.

In the event that it is estimated for the Nth remote copying that remote copying for one of the pairs will not be completed before the start time t5 of the (N+1)th remote copying even if the re-scheduling described above is implemented, based on the predetermined priorities, remote copying is thinned out (suspended) for pairs of low priority and is completed for pairs of high priority. Priority control processing for remote copying is described in the following.

In the re-scheduling described above, an example is given where the amount of data for the Nth remote copy is estimated based on the rate of increase in data for the (N−1)th remote copy and re-scheduling is carried out based on the estimated amount of data to be transferred, but a case may also be supposed where the estimated amount of data to be transferred exceeds the capacity range and the actual amount of data transferred is excessive. In this event, the actual amount of data to be transferred can be understood in the stage of acquiring the Nth snapshot, and it will then be preferable to execute the re-scheduling based on the actual amount of data to be transferred.

Further, the NAS server 20 also changes the remote copy start times t3 and t5 and the snapshot acquisition times t2 and t4 using the re-scheduling described above, and notifies the primary host system 90 to the effect that this process has been carried out when remote copying is thinned out for one of the pairs using priority control processing. Moreover, in the event that the amount of data transferred for one of the pairs exceeds an upper limit for the amount of data transferred in the Nth remote copy, it is taken that the NAS server 20 notifies the primary host system 90 of an error.

The snapshot acquisition times t2 and t4 are times set in advance by the user. It is therefore desirable to perform re-scheduling in such a manner that the remote copy start times t3 and t5 are given priority over the snapshot acquisition times t2 and t4.

Figure 6:
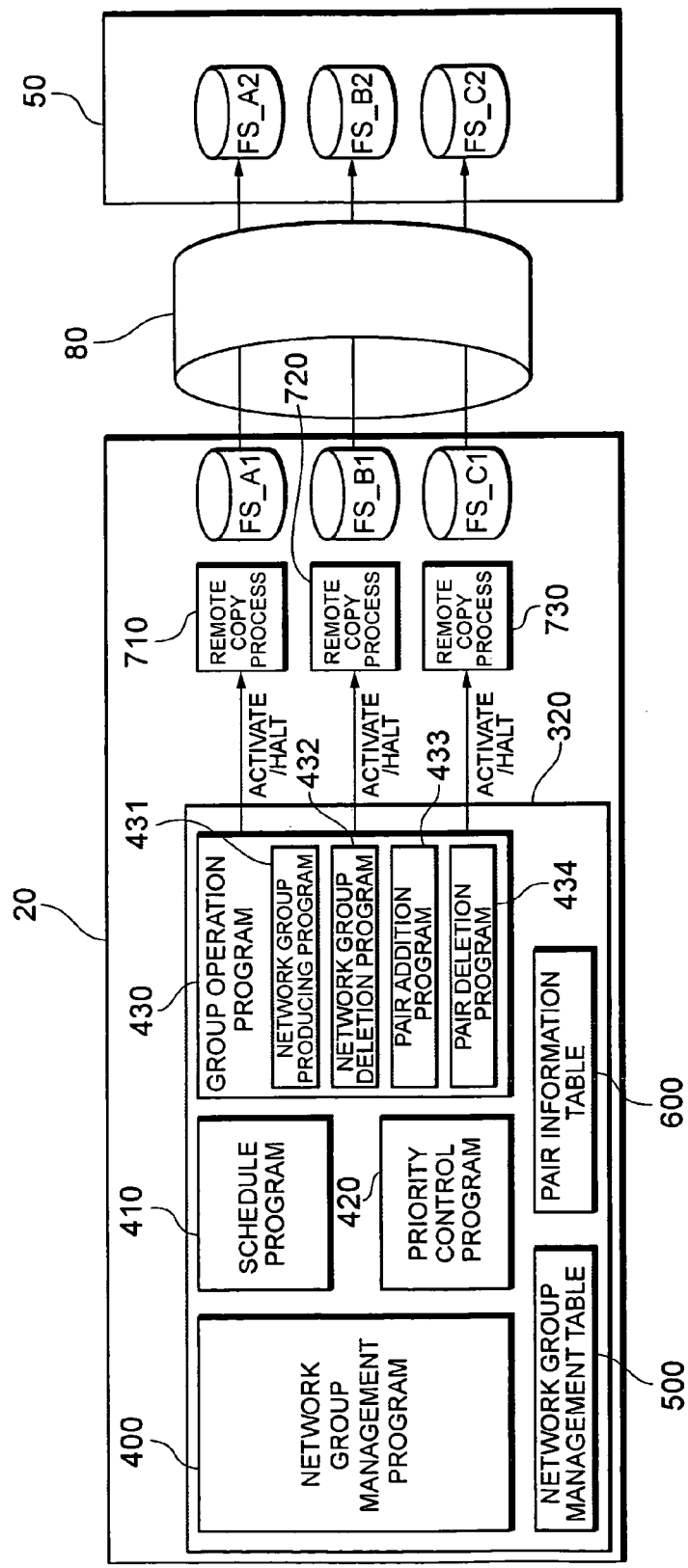
FIG. 6 is a view illustrating a remote copy function centering on a remote copy program software configuration.

FIG. 6 is a view illustrating a remote copy function centering on a remote copy program software configuration. The NAS system 20 has a plurality of file systems FS_A1, FS_B1, and FS_C1. The NAS system 50 has a plurality of file systems FS_A2, FS_B2, and FS_C2. The file system FS_A1 and the file system FS_A2 have a pair relationship. Similarly, the relationship between the file system FS_B1 and the file system FS_B2 and the relationship between the file system FS_C1 and the file system FS_C2 are also pair relationships. For ease of description the three pairs described above are all connected via the same network 80, but may also be connected via respectively different network devices (communication media).

It is essential that re-scheduling of the snapshot acquisition times and remote copying start times described above is carried out for fellow pairs connected to the same network device. This is because the communication band is different every network device. The NAS server 20 sets network groups every communication device and stops remote copy processing for pairs of low priority in the event that it is estimated that remote copying of a pair will not be completed before the start time of the next remote copy within the respective network groups. The NAS server 20 then carries out re-scheduling of the snapshot start times and remote copy start times for the pairs for which remote copying is thinned out in such a manner that remote copy can be achieved without any problems during the next remote copy.

The remote copy program 320 controls activation and halting of remote copy processes 710, 720 and 730 for remote copying difference data for snapshots for the respective file systems $FS\_A_1$, $FS\_B_1$ and FS_C1 to the file systems FS_A2, FS_B2 and FS_C2.

The remote copy program 320 is comprised of a network group management program 400, a scheduling program 410, a priority control program 420, a group operation program 430, a network group management table 500, and a pair information table 600.

The network group management program 400 manages remote copy processing for pairs registered in each network group.

Figure 7:
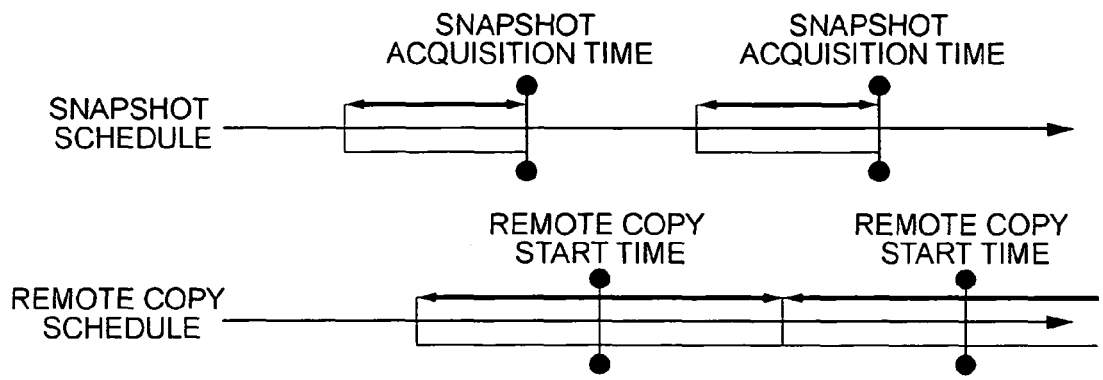
FIG. 7 is an illustration showing range of fluctuation of scheduling of a snapshot acquisition time and a remote copy start time.

The scheduling program 410 is called at a certain timing at the end of acquisition of a snapshot and the end of remote copy processing for a previous time in order to carry out re-scheduling of the remote copy start times and snapshot acquisition times. The scheduling program 410 carries out re-scheduling in such a manner that remote copy processing is complete before the next remote copy start time for all of the pairs in the operation schedule. An upper limit for fluctuation width for the remote copy start time and the snapshot acquisition time is designated by the user. In the event that there is no user designation, as shown in FIG. 7, the upper limit for fluctuation width of the remote copy start times is taken to be half of a remote copy start time interval, and the upper limit of the fluctuation width of the snapshot acquisition time is taken to be half of a snapshot acquisition interval.

The priority control program 420 is activated when, as a result of adjusting the remote copy schedule for each pair registered in a network group, remote copy processing cannot be completed for all of the pairs within a network group simply by moving the remote copy start times or the snapshot acquisition times backwards or forwards. The priority control program 420 then stops remote copy processes for pairs of low priority in such a manner that remote copy processing can be completed before the next remote copy start time for pairs it is planned to have operate within a network group.

The group operation program 430 is comprised of a network group producing program 431, a network group deletion program 432, a pair addition program 433, and a pair deletion program 434. The network group producing program 431 carries out network group production processing. The network group deletion program 432 carries out network group deletion processing. The pair addition program 433 carries out pair addition processing. The pair deletion program 434 carries out pair deletion processing. The details of the network group production processing, network group deletion processing, pair addition processing and pair deletion processing are described in the following.

In carrying out the priority control processing it is necessary to select pairs for which the network device is the same and it is necessary to produce the network group management table 500 and the pair information table 600. After producing the network group management table 500, pair addition or pair addition can be carried out by adding pair information to or deleting pair information from the network group management table 500. When a network group is cancelled, the network group deletion process is carried out.

Figure 8:
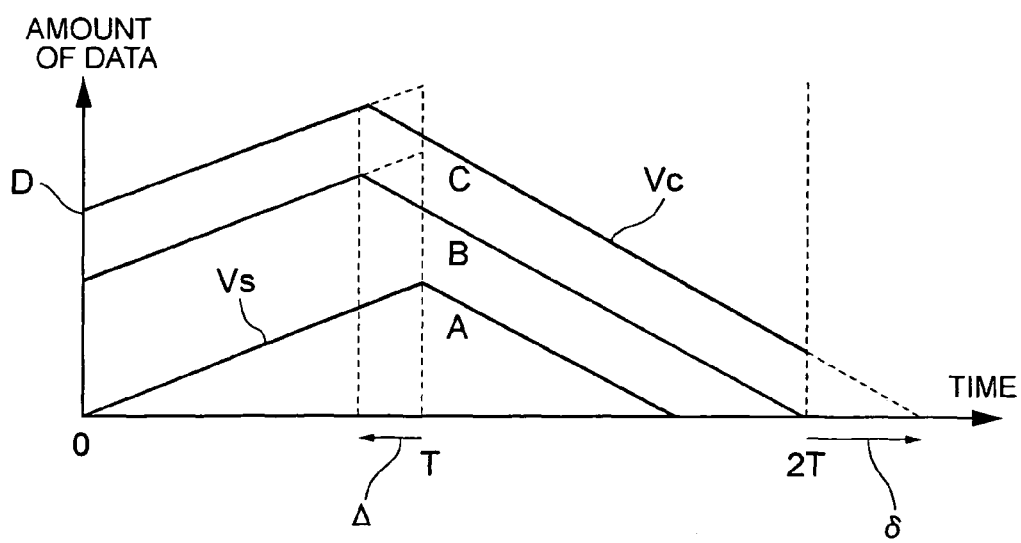
FIG. 8 is a view illustrating a re-scheduling outline.

Next, a description is given of an outline of re-scheduling while referring to FIG. 8. In the following description, T is taken to be a time interval for acquiring snapshots, Vs is rate of increase in snapshot data, Vc is remote copy data transfer speed (fixed value), $\Delta$ is time difference for moving forward, $\delta$ is time difference for moving back, and D is the amount of data for a snapshot of thinned-out pairs.

The following (1) to (3) are assumed.

(1) Normally, a snapshot is taken and remote copy is carried out every time interval T or a time interval after adjustment. The snapshot execution time is ignored and the snapshot acquisition start time, snapshot acquisition end time, and remote copy start time are all assumed to be the same.

(2) Vs is estimated from the amount of data acquired in the snapshot for the previous time.

(3) There is normally a certain amount of time to spare between the end of a remote copy and the start of the next remote copy, as shown in graph A of FIG. 8.

Graph B in FIG. 8 shows the case where the remote copy start time is moved forward. In this case, a data amount D exists at the snapshot acquisition start time because snapshot data for a certain pair is thinned out at the remote copy for the previous time. At this time, remote copying does not finish by the planned time 2T for starting acquisition of the next snapshot. The snapshot acquisition start time planned to be carried out at time T is therefore moved forward by $\Delta$, and the remote copying is finished by time 2T. The amount of data for the snapshot accumulated by the time T$-\Delta$ is then equal to the amount of data remote copied from the time T$-\Delta$ to the time 2T. Namely, Vs(T$-\Delta$)+D=Vc(T+$\Delta$) then holds, to give $\Delta$=((Vs$-$Vc)T+D)/(Vs+Vc). Here, the upper limit of $\Delta$ is T/2.

Graph C in FIG. 8 shows the case where the remote copy start time for the next time is moved back. In this case, in the event that it is not possible for the remote copy to finish by the time 2T just by moving the remote copy start time forward as described above, the remote copy start time for the next time planned to be carried out at time 2T is put back by $\delta$, and remote copying is made to finish by time 2T+$\delta$. The amount of data for the snapshot accumulated by the time T$-\Delta$ is then equal to the amount of data remote copied from the time T$-\Delta$ to the time 2T+$\delta$. Namely, Vs(T$-\Delta$)+D=Vc(T+$\Delta$+$\delta$) then holds, to give $\delta$=((Vs$-$Vc)T$-$(Vs+Vc)$\Delta$+D)Nc. Here, the upper limit of $\delta$ is T/2.

FIG. 9 shows the network management table 500. The network management table 500 takes "network device name", "pair number", "communication band", and "pair information" as table elements. "Network device name" shows the names of network devices utilized by the registered pairs. "Pair number" is the number of pairs registered for each network group. "Communication band" is the communication band of the network device. "Pair information" shows the name of pairs constituting targets of priority control within the same network group.

FIG. 10 shows the pair information table 600. The pair information table 600 takes "pair name", "remote copy start time", "start time of next remote copy", "priority", "difference snapshot size", and "remote copy state" as table elements. "Pair name" shows the name of pairs constituting targets of priority control within the same network group. "Remote copy start time" shows the start time of the remote copy. "Start time of next remote copy" shows the start time of the next remote copy. "Priority" is an index for determining stopping of the remote copy process by the priority control process. "Difference snapshot size" indicates the amount of data transferred. "Remote copy state" indicates one of either "standby" or "in operation".

Figure 11:
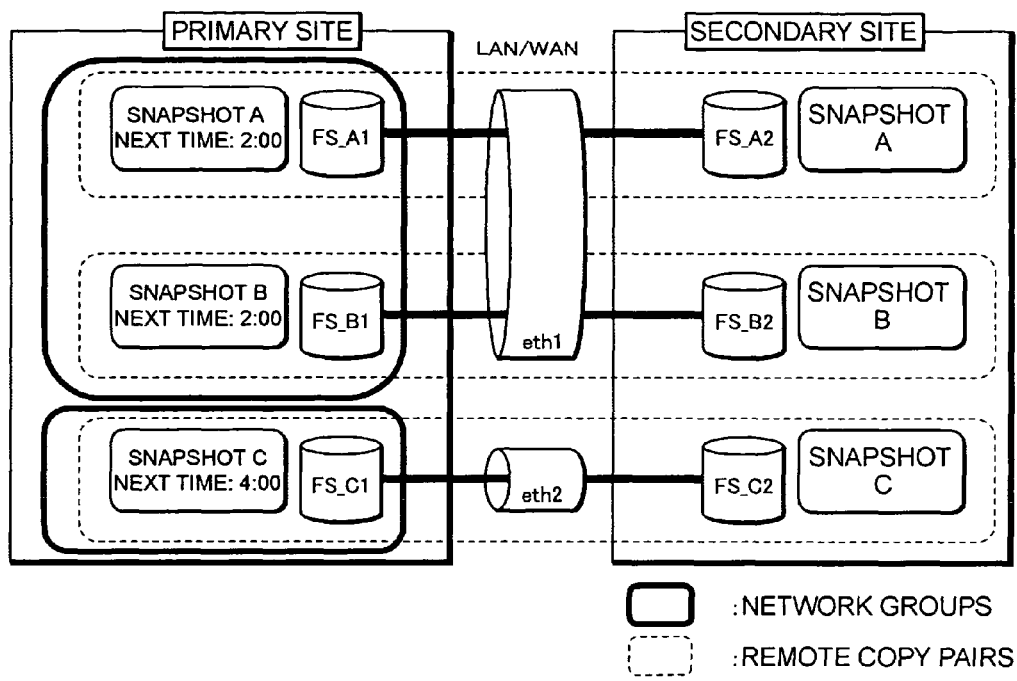
FIG. 11 is a system configuration view of a storage system.

Next, a description is given of detailed examples of the network group management table 500 and the pair information table 600 while referring to FIG. 11 to FIG. 13.

As shown in FIG. 11, a pair (hereinafter referred to with the pair name "snapshot A") comprised of file system FS_A1 and file system FS_A2, and a pair (hereinafter referred to with the pair name "snapshot B") comprised of file system FS_B1 and file system FS_B2 are registered in a first network device eth1. A pair (hereinafter referred to with the pair name "snapshot C") comprised of file system FS_C1 and file system FS_C2 is registered in the second network device eth2.

Network group management information for the storage system shown in FIG. 11 is registered in the network group management table 500 shown in FIG. 12. The pair number for the network group of network device name "eth1" is 2, the communication band is 10 MB/sec, and the pair information is "snapshot A, snapshot B". The pair number for the network group of network device name "eth2" is 1, the communication band is 100 MB/sec, and the pair information is "snapshot C".

Pair information for the storage system shown in FIG. 11 is registered in the pair information table 600 shown in FIG. 13. The start time of next remote copy for pair name "snapshot A" is 2:00, the acquisition time for the snapshot for the next time is 2:00, priority is 1, and the remote copy state is "standby". The start time of next remote copy for pair name "snapshot B" is 2:00, the acquisition time for the snapshot for the next time is 2:00, priority is 2, and the remote copy state is "standby".

Figure 14:
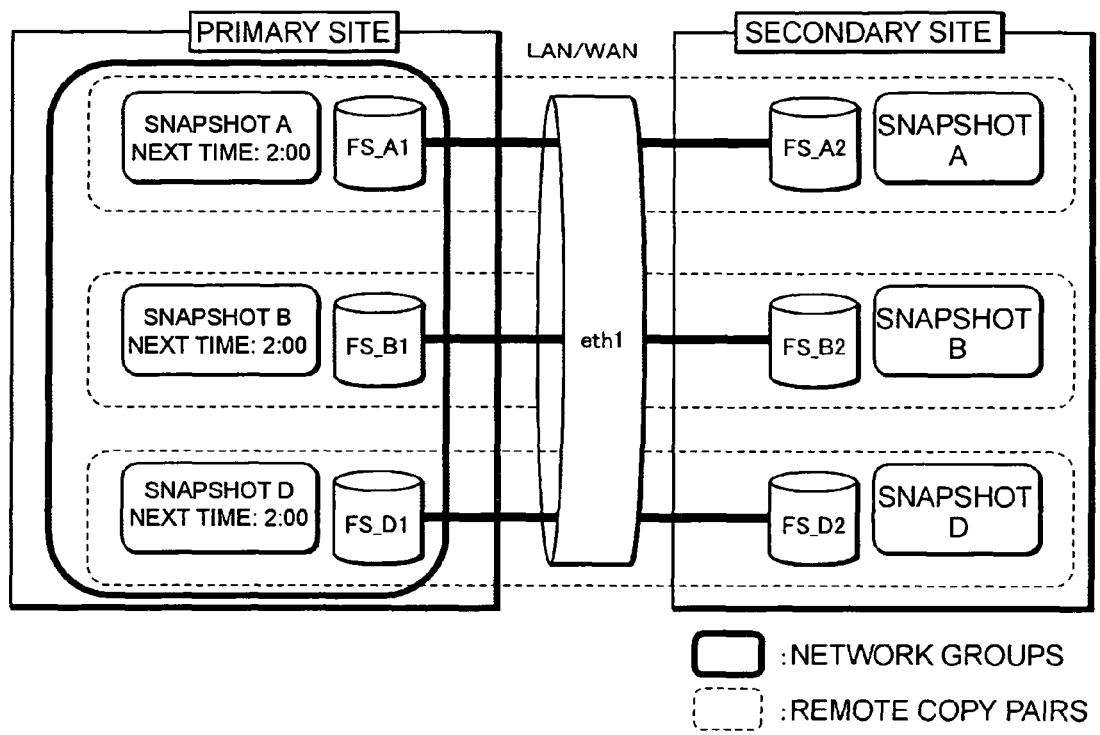
FIG. 14 is a further system configuration view of a storage system.

The start time of next remote copy for pair name "snapshot C" is 4:00, the acquisition time for the snapshot for the next time is 4:00, priority is 1, and the remote copy state is "standby";

Next, a description is given of specific examples of the network group management table 500 and pair information table 600 while referring to FIG. 14 to FIG. 16 in the event of adding a new pair to the first network group eth1.

As shown in FIG. 14, a pair (hereinafter referred to as the pair name "snapshot D") comprised of file system FS_D1 and file system FS_D2 is newly added to the first network group eth1. In doing so, as shown in FIG. 15, the pair number of the network group of the network device name "eth1" occurring at the network group management table 500 is updated to 3, the pair information is updated to "snapshot A, snapshot B, snapshot D", and as shown in FIG. 16, the pair name "snapshot D" is newly added to the pair information table 600. The start time of next remote copy for snapshot D is 2:00, the acquisition time for the snapshot for the next time is 2:00, priority is 2, and the remote copy state is "standby".

Figure 17:
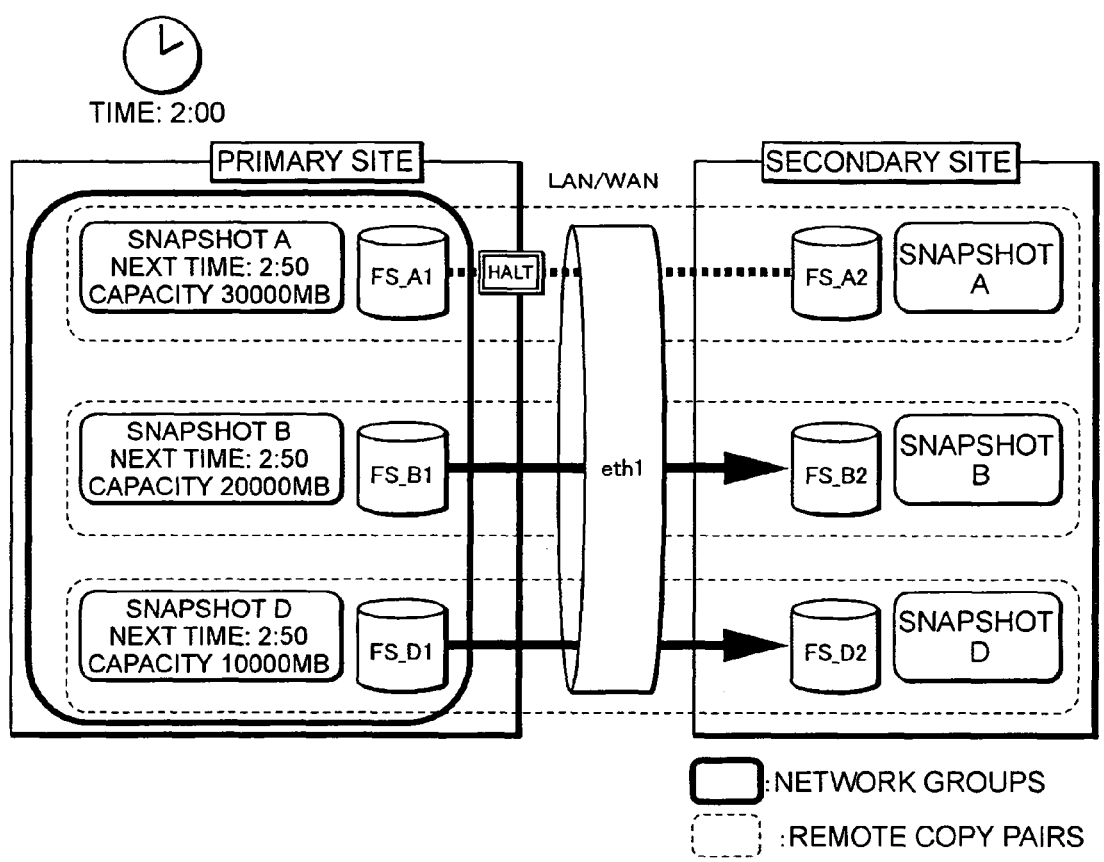
FIG. 17 is another system configuration view of a storage system.

Next, a description is given while referring to FIG. 17 to FIG. 19 of the priority control process for remote copying.

As shown in the pair information table 600 of FIG. 19, the amount of data transferred for snapshot A is 30000 MB, the amount of data transferred for snapshot B is 20000 MB, and the amount of data transferred for snapshot D is 10000 MB. The communication band is 10 MB/sec, and the amount of data it is possible to transfer between remote copy start time intervals of fifty minutes is 10(MB/sec)×50×60(sec)=30000 MB. The total amount of data for snapshots A, B, D is 60000 MB. It is therefore not possible to remote copy all of the data for the snapshots A, B, D in fifty minutes. The amount of data that can be transferred when the remote copy start time for the next time is put back by the maximum of twenty-five minutes is 10(MB/sec)×75×60(sec)=45000 MB. It is therefore also not possible to remote copy data for all of the snapshots A, B and D in seventy-five minutes. A priority control process is therefore implemented, and remote copying of snapshot A, which has the lowest priority, is halted. In doing so, the total amount of data for the snapshots B and D is 30000 MB, and it is therefore possible to remote copy all of the data for the snapshots B, D in fifty minutes.

As a result of the priority control process, remote copying is not implemented for the pair name "snapshot A" at the current time, the start time for the remote copy for the next time is set to 2:50, the snapshot acquisition time for the next time is set to 2:50, priority is set to 1, and the remote copy state is set to "standby". The remote copy start time for pair name "snapshot B" is 2:00, the next remote copy start time is 2:50, the acquisition time for the next snapshot is 2:50, priority is 3, and the remote copy state is "in operation". The remote copy start time for pair name "snapshot D" is 2:00, the next remote copy start time is 2:50, the acquisition time for the next snapshot is 2:50, priority is 2, and the remote copy state is "in operation".

It is also possible that the communication band for the network device may become narrower due to a communication fault, etc. In this event, the value of the communication band of the network group management table 500 is updated to the newest value. The scheduling program 410 then carries out re-scheduling using the newest communication band value. In the event that remote copying cannot be completed for all the pairs even after performing re-scheduling using the newest communication band, the priority control program 420 carries out priority control processing using the newest communication band value.

Figure 20:
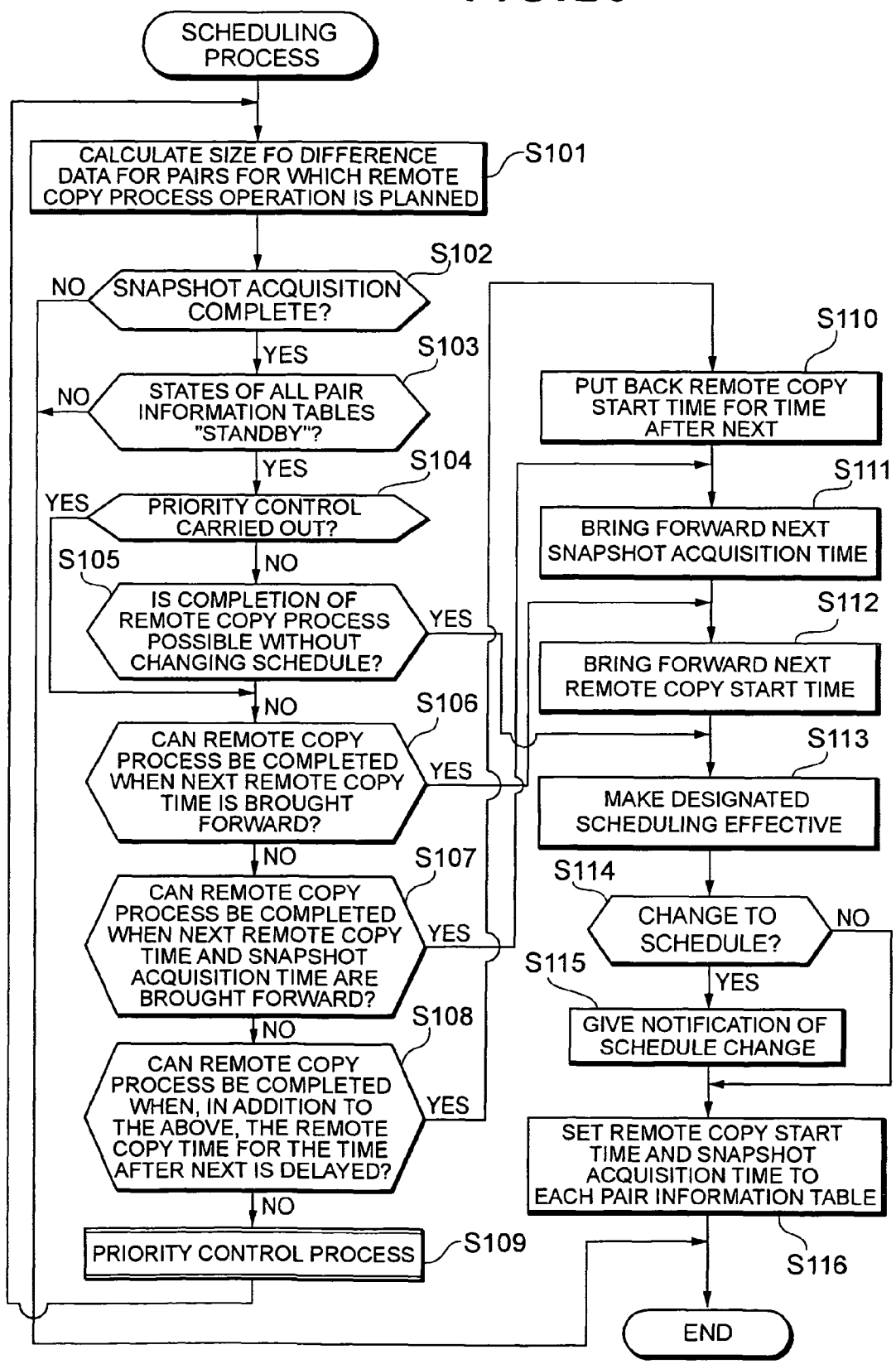
FIG. 20 is a flowchart describing a scheduling process.

FIG. 20 is a flowchart describing a scheduling process executed by the scheduling program 410.

The scheduling program 410 calculates the amount of snapshot difference data for pairs for which execution of the remote copy process is planned (S101).

Next, the scheduling program 410 checks whether or not snapshot acquisition is complete (S102). If acquisition of the snapshot is not complete (S102: NO), the scheduling program 410 omits the process routine.

If acquisition of the snapshot is complete (S102: YES), the scheduling program 410 checks whether or not all of the states in the pair state table are in "standby" (S103). In the event that one of the states of the pair state table is not in "standby" (S103: NO), the scheduling program 410 omits the process routine.

In the event that all of the states of the pair state table are in "standby" (S103: YES), the scheduling program 410 checks whether or not priority control has been carried out (S104). In the event that priority control has been carried out, the scheduling program 410 proceeds to S106.

In the event that priority control is being carried out (S104: NO), the scheduling program 410 checks whether or the remote copy process can be completed without updating the schedule (S105). In the event that the remote copy process can be completed without updating the schedule (S105: YES), the scheduling program 410 proceeds to S113.

In the event that the remote copy process cannot be completed with no updating to the schedule taking place (S105: NO), the scheduling program 410 checks whether or not it is possible to complete the remote copy process by moving the start time for the remote copy for the next time forward (S106). In the event that the remote copy process can be completed by moving the start time for the remote copy for the next time forward (S106: YES), the scheduling program 410 proceeds to S112.

In the event that the remote copy process cannot be completed by moving the start time for remote copy for the next time forward (S106: NO), the scheduling program 410 checks whether or not it is possible to complete the remote copy process by moving the remote copy start time and the snapshot acquisition time for the next time respectively forward (S107). In the event that the remote copy process can be completed by moving the start time for the remote copy and the snapshot acquisition time for the next time forward (S107: YES), the scheduling program 410 proceeds to S111.

In the event that the remote copy process cannot be completed by moving the remote copy start time and the snapshot acquisition time for the next time forward (S107: NO), the scheduling program 410 checks whether or not it is possible to complete the remote copy process by moving the remote copy start time and the snapshot acquisition time for the next time respectively forward and moving back the remote copy start time for the time after next (S108).

In the event that it is not possible to complete the remote copy process by moving the remote copy start time and the snapshot acquisition time for the next time forward and by putting the remote copy start time for the time after next back (S108: NO), the scheduling program 410 carries out priority control processing (S109) and returns to S101.

In the event that it is possible to complete the remote copy process by moving the remote copy start time and the snapshot acquisition time for the next time forward and by putting the remote copy start time for the time after next back (S108: YES), the scheduling program 410 puts back the remote copy start time for the time after next (S110).

Next, the scheduling program 410 moves the snapshot acquisition time for the next time forwards (S111).

After this, the scheduling program 410 moves the remote copy start time for the next time forwards (S112).

The scheduling program 410 then makes the re-scheduled schedule effective (S113).

Next, the scheduling program 410 checks whether or not the schedule has been changed (S114). In the event that there are changes in the schedule (S114: YES), the scheduling program 410 gives notification of the schedule change (S115), and sets the remote copy start time and snapshot acquisition time in each pair information table (S116).

In the event that there is no change to the schedule (S114: NO), the scheduling program 410 proceeds to S116.

Figure 21:
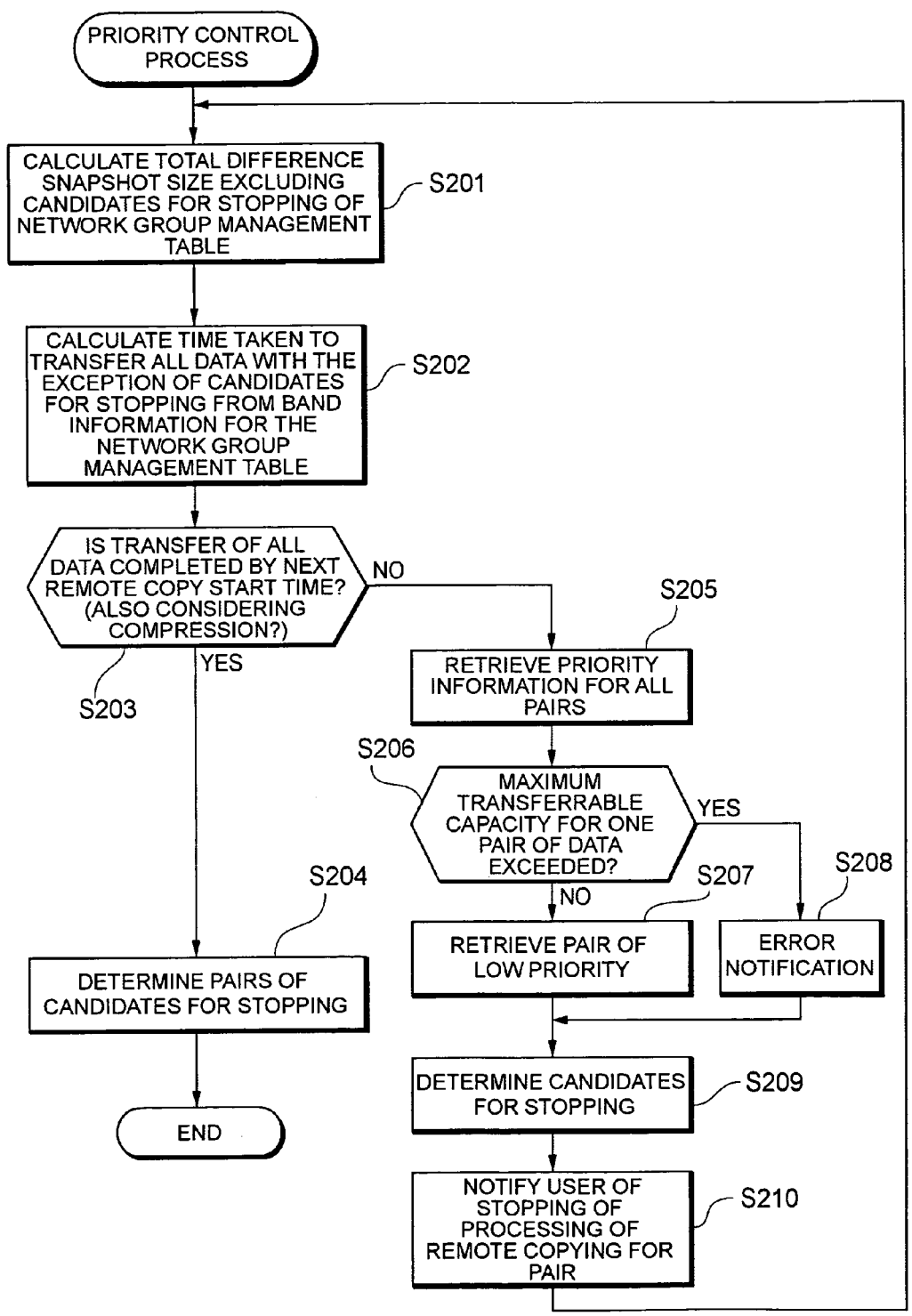
FIG. 21 is a flowchart describing a priority control process.

FIG. 21 is a flowchart describing a priority control process executed by the priority control program 420.

The priority control program 420 then calculates a total value for the amount of snapshot difference data for the remaining pairs from within pairs recorded in the network group management table 500 excluding pairs constituting candidates for stopping of the remote copy process (S201).

Next, the priority control program 420 calculates the data transfer time for the remaining pairs excluding pairs constituting candidates for the remote copy process being stopped, based on information for the communication band registered in the network group management table 500 (S202).

Next, the priority control program 420 checks whether or not data transfer is complete by the remote copy start time for the next time (S203). At this time, it is taken that a check is made as to whether or not data transfer is complete including the case where data is compressed.

In the event that data transfer is complete before the remote copy start time for the next time (S203: YES), the priority control program 420 determines pairs constituting candidates for stopping of the remote copy process (S204).

In the event that data transfer is not completed by the remote copy start time for the next time (S203: NO), the priority control program 420 retrieves priority information for all of the pairs (S205).

Next, the priority control program 420 checks whether or not the amount of data transferred for one pair of data exceeds the maximum capacity it is possible to transfer (S206). In the event that the amount of data transferred for one pair does not exceed the maximum capacity it is possible to transfer (S206: NO), the priority control program 420 retrieves the pair of the lowest priority (S207), determines the retrieved pair as a candidate for stopping of remote copy processing (S209), and notifies the user of halting of the remote copy process (S210).

In the event that the data transfer amount for one pair exceeds the maximum capacity it is possible to transfer (S206: YES), the priority control program 420 performs error notification (S208) and proceeds to S209.

Figure 22:
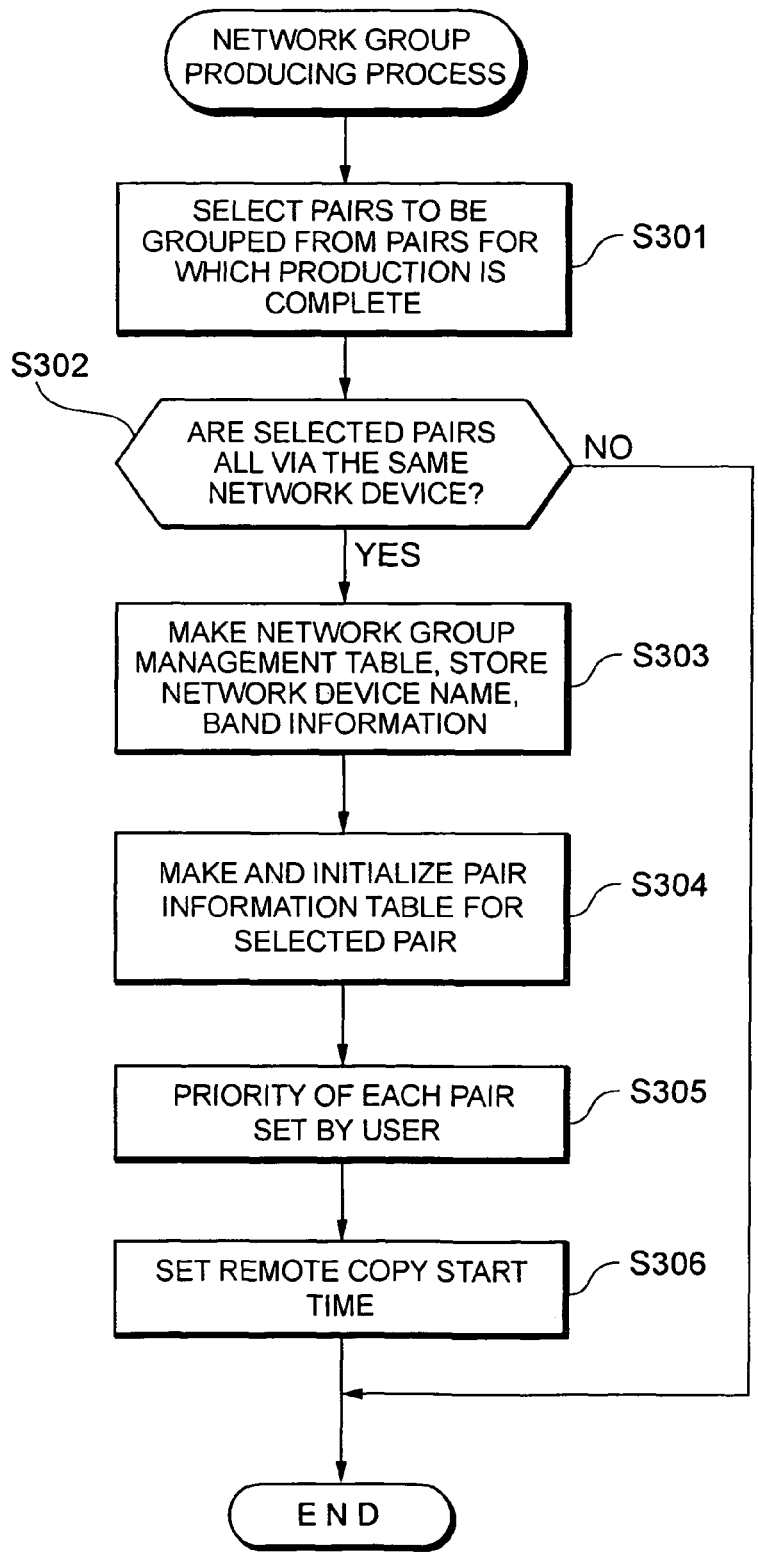
FIG. 22 is a flowchart describing a network group production process.

FIG. 22 is a flowchart describing a network group producing process executed by the network group producing program 431.

The network group producing program 431 selects pairs to be grouped from within pairs for which production is complete (S301).

Next, the network group producing program 431 checks whether or not the selected pairs are all using the same network device (S302). In the event that some of the selected pairs are not using the same network device (S302: NO), the network group producing program 431 omits the process routine.

In the event that all of the selected pairs are using the same network device (S302: YES), the network group producing program 431 produces the network group management table 500 and stores the "network device name" and the "communication band" in the network group management table 500 (S303).

Next, the network group producing program 431 makes and initializes the pair information table 600 for the selected pairs (S304).

After this, the network group producing program 431 sets the priority for each pair based on an input by the user (S305).

Next, the network group producing program 431 sets the remote copy start time for each pair (S306).

Figure 23:
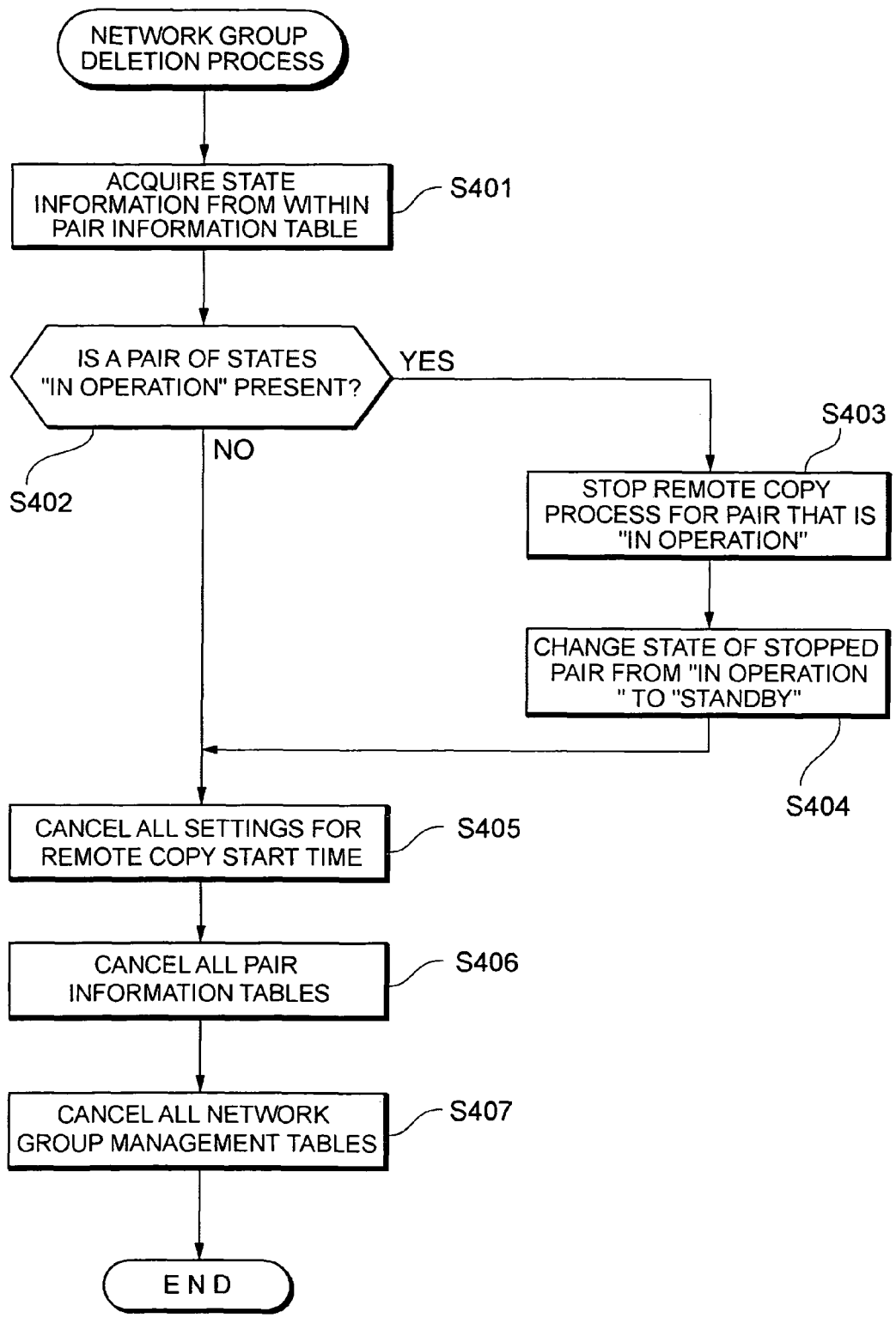
FIG. 23 is a flowchart describing a network group deletion process.

FIG. 23 is a flowchart describing a network group deletion process executed by the network group deletion program 432.

The network group deletion program 432 acquires state information registered in the pair information table 600 (S401).

Next, the network group deletion program 432 checks whether or not a pair with states of "in operation" is present (S402). In the event that a pair with states of "in operation" exists (S402: YES), the network group deletion program 432 halts the remote copy process for the pair that is "in operation" (S403), and the states for the pair for which the remote copy has been stopped are changed from "in operation" to "standby" (S404).

Next, the network group deletion program 432 cancels all of the settings for the remote copy start times (S405), annuls all of the pair information table 600 (S406), and cancels the whole of the network group management table 500 (S407).

In the event that a pair where the states are "in operation" does not exist (S402: NO), the network group deletion program 432 proceeds to the process of S405.

Figure 24:
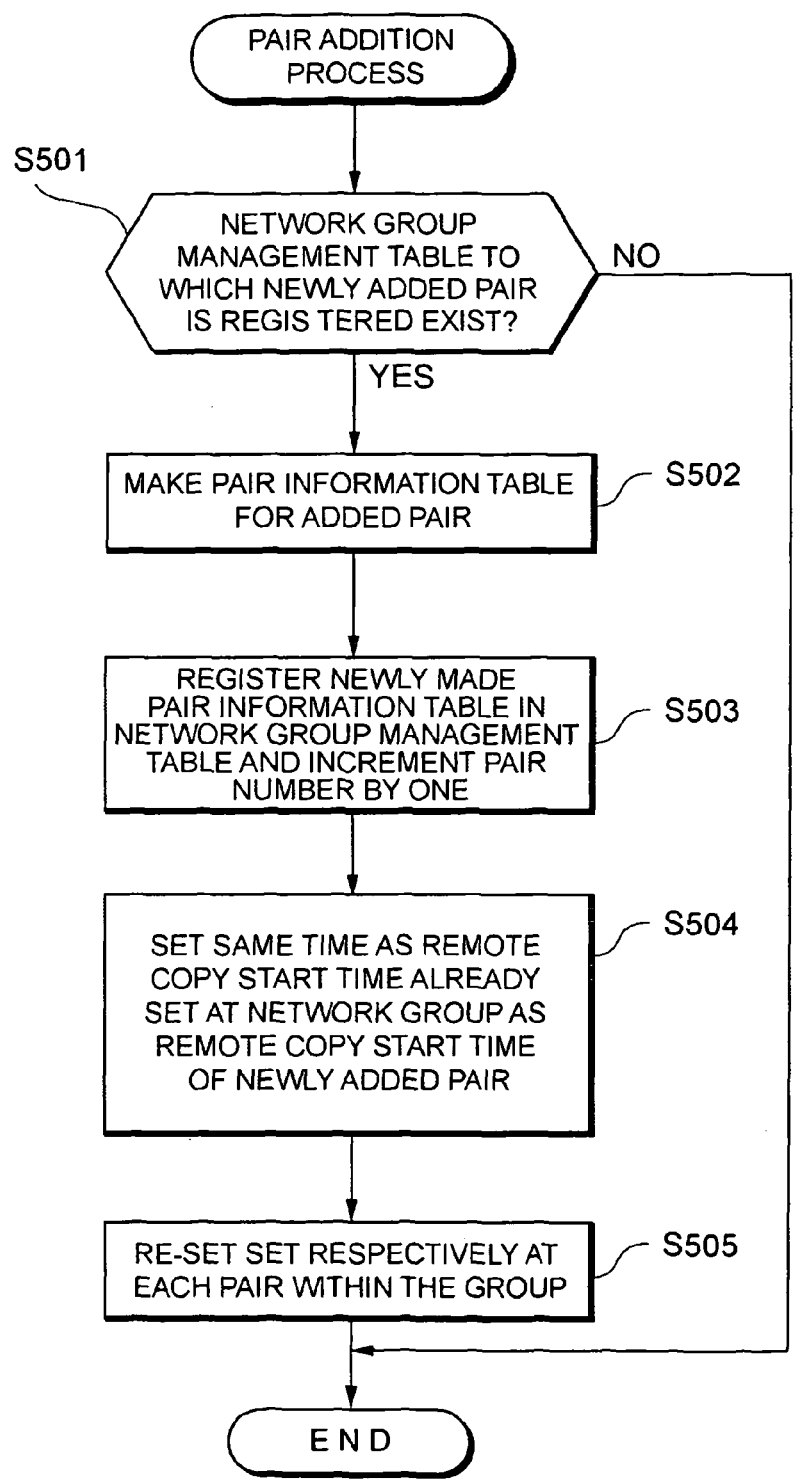
FIG. 24 is a flowchart describing a pair addition process.

FIG. 24 is a flowchart describing a pair addition process executed by the pair addition program 433.

The pair addition program 433 checks whether or not a network management table 500 registering a newly added pair exists (S501). In the event that a network management table 500 for registering a newly added pair does not exist (S501: NO), the pair addition program 433 omits the process routine.

In the event that a network management table 500 for registering a newly added pair does exist (S501: YES), the pair addition program 433 makes a new pair information table 600 for the newly added pair (S502).

Next, the pair addition program 433 registers the pair information table 600 in the network group management table 500 and the "pair number" registered in the network group management table 500 is incremented by one (S503).

After this, the pair addition program 433 sets the remote copy start time for the newly added pair to the same time as the remote copy start time already set for pairs within the network group the newly added pair belongs to (S504).

Next, the pair addition program 433 resets the priority of each pair set within the network group based on input from the user (S505).

Figure 25:
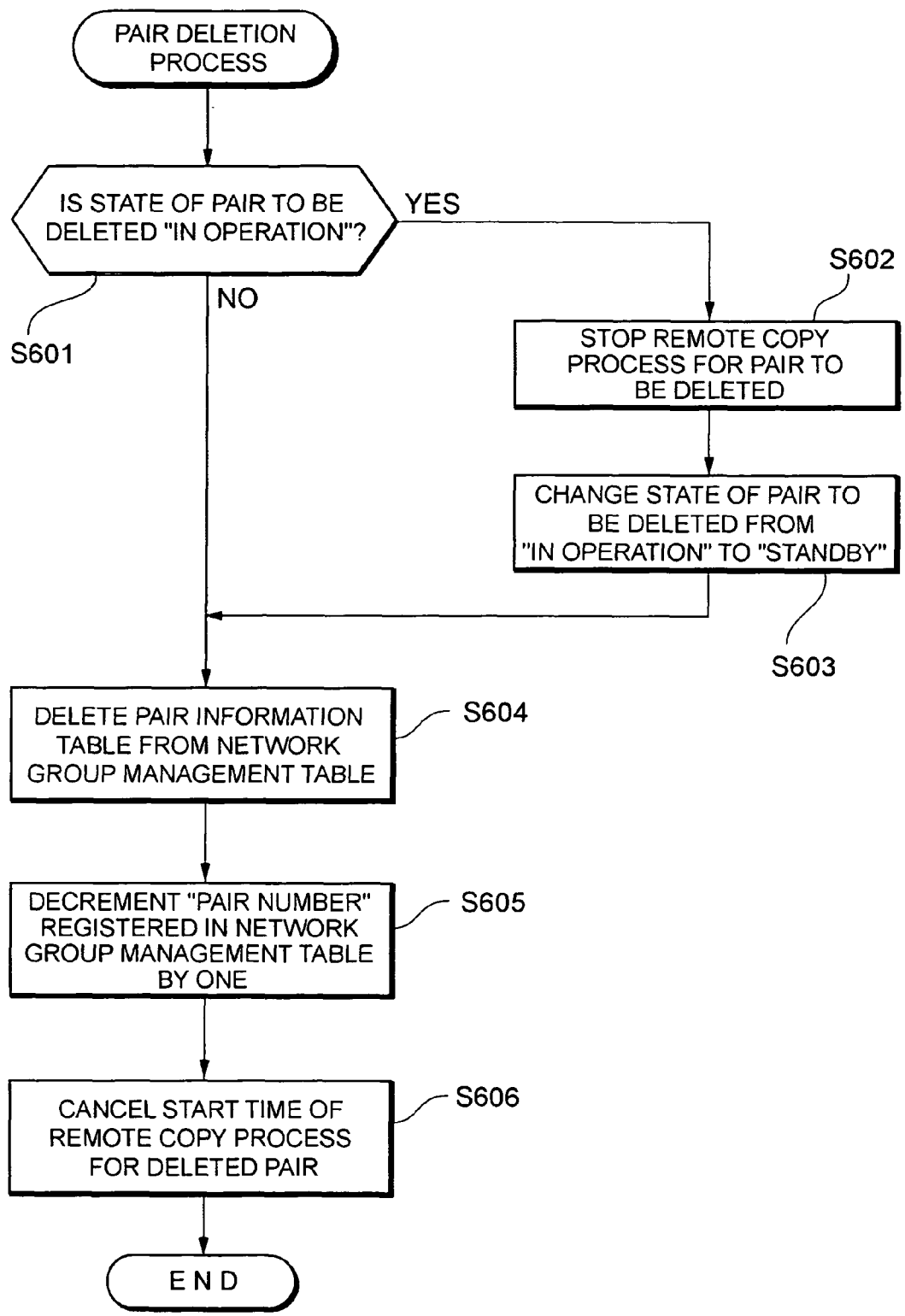
FIG. 25 is a flowchart describing a pair deletion process.

FIG. 25 is a flowchart describing a pair deletion process executed by the pair deletion program 434.

The pair deletion program 434 checks whether or not the state of a pair to be deleted is "in operation" (S601).

In the event that the state of the pair to be deleted is "in operation" (S601: YES), the pair deletion program 434 halts the remote copy process for the pair to be deleted (S602), and changes the state of the pair to be deleted from "in operation" to "standby" (S603).

Next, the pair deletion program 434 deletes the pair information table 600 from the network group management table 500 (S604), decrements the "pair number" registered in the network group management table 500 by one (S605), and cancels the remote copy start time for the deleted pair (S606).

In the event that the state of the pair to be deleted is not "in operation" (S601: NO), the pair deletion program 434 proceeds to S601.

Next, a description is given with reference to FIG. 26 to FIG. 30 of a process where a state where remote copying is possible can be achieved even without re-scheduling in the event that the amount of difference data for the snapshot increases at a certain timing.

In FIG. 26 to FIG. 30, time t1, t3, t5, t7, t9, t11 and t13 indicate snapshot acquisition times, and time t0, t2, t4, t6, t8, t10, t12 and t14 indicate remote copy start times. Dn shows the tendency of the amount of difference data accumulated by acquisition of the nth snapshot (where n=1, 2, 3, 4, 5, 6, 7) to increase. Dn' shows the tendency of the amount of data not yet transferred to reduce as a result of the nth remote copy (n=1, 2, 3, 4, 5, 6, 7).

Figure 26:
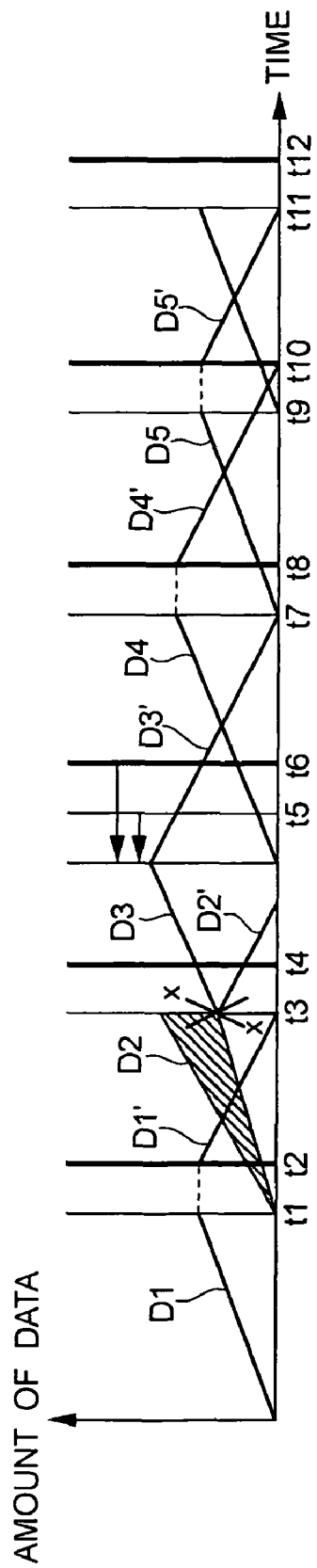
FIG. 26 is a graph showing change in the amount of difference data for a snapshot.

FIG. 26 shows the case 1 constituted by data regions where the write destinations to the primary volume 41 are all different. In case 1, the amount of difference data for the snapshot increases at the timing of the time t3, and remote copying is thinned out for some of the difference data in the second remote copy. Because of this, the initial value for the amount of difference data accumulated from time t3 to time t5 is x. Re-scheduling is then performed so as to move the time for starting remote copying for a third time planned for execution at time t6 forward, and remote copying of the remaining difference data is made to finish at the point in time at time t7. The influence of the amount of difference data increasing at the timing of time t3 is cancelled at the timing of time t9.

Figure 27:
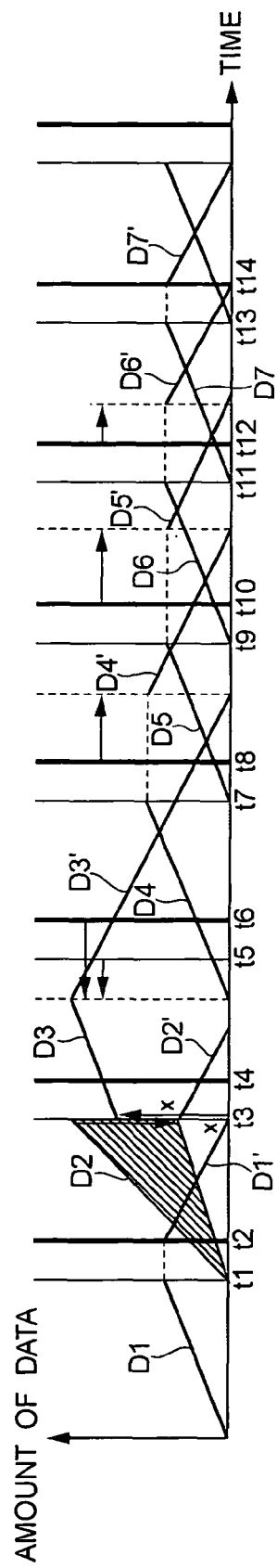
FIG. 27 is further a graph showing change in the amount of difference data for a snapshot.

FIG. 27 shows the case 2 constituted by data regions where the write destinations to the primary volume 41 are all different. In case 2, the amount of difference data for the snapshot increases at the timing of the time t3, and remote copying is thinned out for some of the difference data in the second remote copy. In remote copying for the third time, re-scheduling is carried out in order to transfer the accumulated difference data. The time for starting the remote copying for the third time planned for execution at time t6 is then brought forward, and the time for starting remote copying for the fourth time planned for execution at time t8 is put back. The influence of the amount of difference data increasing at the timing of time t3 is cancelled at the timing of time t13.

Figure 28:
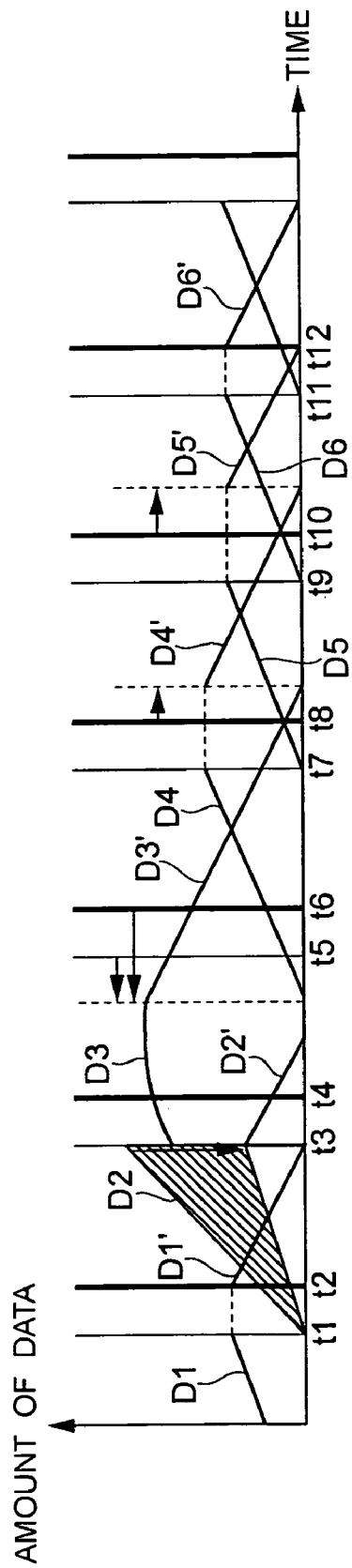
FIG. 28 is another graph showing change in the amount of difference data for a snapshot.

FIG. 28 shows the case 3 constituted by data regions where some of the write destinations to the primary volume 41 are the same. In case 3, the amount of difference data for the snapshot increases substantially at the timing of time t3. When case 3 is compared with case 2, it can be seen that the amount of difference data accumulated at the timing of time t5 is different. In cases other than case 3, assuming the worst case where the worst case where the update positions for the primary volume 41 are all different, it can be considered that the possibility of data being overwritten is higher when the amount of data updated for the primary volume 41 is larger. As a result, it is possible to make the amount of data that is remote copied smaller by thinning out some of the data rather than remote copying all of the updated data. In case 3, the influence of the amount of difference data increasing at the timing of time t3 is cancelled at the timing of time t11.

Figure 29:
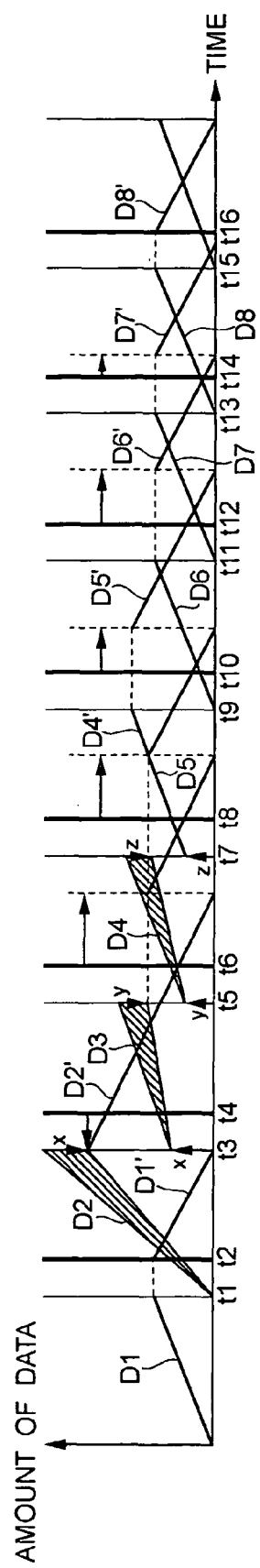
FIG. 29 is still further graph showing change in the amount of difference data for a snapshot.

FIG. 29 shows case 4 occurring as a result of consecutive thinning out processes for the transferred data. In case 4, the amount of difference data for the snapshot increases at the timing of the time t3, and remote copying is thinned out for some of the difference data in the second remote copy. However, as the amount of difference data is large, even if re-scheduling is implemented in the first thinning-out process, it is not possible to finish transferring all of the difference data in the second remote copy. The difference data is therefore also thinned out in the third and fourth remote copies in addition to the thinning out process in the second remote copy. The influence of the amount of difference data increasing at the timing of time t3 is cancelled at the timing of time t13.

FIG. 30 shows a case 5 where the amount of difference data for the snapshot exceeds the transferable capacity. In case 5, the amount of difference data for the snapshot increases at the timing of the time t3, and remote copying is thinned out for some of the difference data in the second remote copy. However, the amount of difference data exceeds the transferable capacity even if re-scheduling is implemented. It is therefore not possible to complete remote copying, and error notification is performed. The excessive amount of difference data is therefore continued to be thinned out across an plurality of times.

According to this embodiment, whether or not remote copying will finish is estimated based on the amount of difference data for a snapshot, and when it is estimated that remote copying will not finish, it is possible to ensure that remote copying will finish by re-scheduling the snapshot acquisition times or the remote copy start times.

The NAS system of this embodiment may be a system comprised of a NAS server and storage control apparatus, or a system comprised of a NAS server, storage control device, and storage device (disc drive, etc.).

What is claimed is:

1. A NAS (network attached storage) system including a NAS server and one or more file systems including a storage device for storing data, the NAS server comprising:

a snapshot producing section carried out by at least one processor unit, where the snapshot producing section controls production of snapshots for the file systems based on pre-scheduled snapshot acquisition times;

a remote copy section carried out by the at least one processor unit, where the remote copy section controls remote copying of difference data indicating differences in data between two predetermined snapshots, based on pre-scheduled remote copy start times; and a scheduling section, carried out by the at least one processor unit, where the scheduling section controls selective moving of a pre-scheduled snapshot acquisition time and a pre-scheduled remote copy start time forward and backward in time, and where the scheduling section checks whether remote copying starting at an Nth remote copy start time will finish by an (N+1)th remote copy start time, based on an estimated amount of remote copy transfer data and a communication bandwidth, and moves forward or backward a time of at least one of: an Nth snapshot acquisition time, an Nth remote copy start time, and an (N+1)th remote copy start time, so that remote copying starting at the Nth remote copy start time finishes by the (N+1)th remote copy start time, wherein the scheduling section executes a thinning out process of thinning out some of data to be transferred and a re-scheduling process, when the amount of updated data is greater than a predetermined amount where a possibility of data being overwritten becomes high; and the NAS system further comprising an estimating section carried out by the at least one processor unit, where the estimating section estimates an amount of difference data for a snapshot of the file systems acquired at the Nth remote copy start time based on an amount of difference data for a snapshot of the file system acquired at the (N−1)th remote copy start time, wherein the scheduling section executes the move forward or backward based on the estimated amount of difference data calculated by the estimating section.

2. The NAS system according to claim 1, wherein the scheduling section moves the Nth remote copy start time forward responsive to the check conducted on a basis of the estimated amount of difference data estimated by the estimating section as remote copy transfer data, indicating that the remote copying starting at the Nth remote copy start time will not finish by the (N+1)th remote copy start time.

3. The NAS system according to claim 1, wherein the scheduling section moves the Nth remote copy start time forward and moves the Nth snapshot acquisition time forward, responsive to the check conducted on a basis of the estimated amount of difference data estimated by the estimating section as remote copy transfer data, indicating that the remote copying starting at the Nth remote copy start time will not finish by the (N+1)th remote copy start time.

4. The NAS system according to claim 1, wherein the scheduling section moves the Nth remote copy start time forward, moves the Nth snapshot acquisition time forward, and moves the (N+1)th remote copy start time back, responsive to the check conducted on a basis of the estimated amount of difference data estimated by the estimating section as remote copy transfer data, indicating that the remote copying starting at the Nth remote copy start time will not finish by the (N+1)th remote copy start time.

5. The NAS system according to claim 1,
comprising a priority control section carried out by the at least one processor unit, where the priority control section executes priority control in such a manner as to thin out remote copying of difference data for snapshots for file systems of low priority in an event that it is estimated that remote copying of difference data for snapshots of a file system of a plurality of files systems, cannot be completed even if moving forward or backward of time is implemented, where a priority is related to a copy pair condition on the remote copying.

6. The NAS system according to claim 5, wherein the plurality of file systems is split into groups corresponding to every network device, and the priority control section executes priority control on file systems belonging to a same group.

7. A remote copy method for use in a NAS (network attached storage) server connected to one or more file system including a storage device for storing data, the method carried out by at least one processor unit and comprising:
producing snapshots for the file systems based on pre-scheduled snapshot acquisition times;
remote copying difference data indicating differences in data between two predetermined snapshots, based on pre-scheduled remote copy start times; and
providing a selective moving capability of a pre-scheduled snapshot acquisition time and a pre-scheduled remote copy start time forward and backward in time, and checking whether remote copying starting at an Nth remote copy start time will finish by an (N+1)th remote copy start time, based on an estimated amount of remote copy transfer data and a communication bandwidth, and moving forward or backward a time of at least one of: an Nth snapshot acquisition time, an Nth remote copy start time, and an (N+1)th remote copy start time, so that remote copying starting at the Nth remote copy start time finishes by the (N+1)th remote copy start time,
wherein a thinning out process of thinning out some of data to be transferred and a re-scheduling process are executed, when an amount of updated data is greater that a predetermined amount where a possibility of data being overwritten becomes high; and
estimating an amount of difference data for a snapshot of the file systems acquired at the Nth remote copy start time based on an amount of difference data for a snapshot of the file system acquired at the (N−1)th remote copy start time,
wherein the scheduling section executes the move forward or backward based on the estimated amount of difference data calculated by the estimating section.

8. The remote copy method according to claim 7, wherein in the moving forward or backward, the Nth remote copy start time is moved forward responsive to the checking revealing that remote copying starting at the present Nth remote copy start time will not allow the remote copying to finish an (N+1)th remote copy start time.

9. The remote copy method according to claim 7, wherein in the moving forward or backward, the Nth remote copy start time is moved forward and the Nth snapshot acquisition time is moved forward, responsive to the checking revealing that remote copying starting at the Nth remote copy start time will not allow the remote copying to finish by the (N+1)th remote copy start time.

10. The remote copy method according to claim 7, wherein in the moving forward or backward, the Nth remote copy start time is moved forward, the Nth snapshot acquisition time is moved forward, and the (N+1)th remote copy start time is moved back, responsive to the checking revealing that remote copying starting at the Nth remote copy start time will not allow the remote copying to finish by the (N+1)th remote copy start time.

11. The remote copy method according to claim 7,
comprising executing priority control in such a manner as to thin out remote copying of difference data for snapshots for file systems of low priority in an event that it is estimated that remote copying of difference data for snapshots of a file system of a plurality of files systems, cannot be completed even if moving forward or backward of time is implemented, where a priority is related to a copy pair condition on the remote copying.

12. The remote copy method according to claim 11, wherein the plurality of file systems is split into groups corresponding to every network device, and the executing priority control executes priority control on file systems belonging to a same group.

* * * * *